(12) United States Patent
Imai

(10) Patent No.: US 9,950,504 B2
(45) Date of Patent: Apr. 24, 2018

(54) ELASTIC COMPOSITE FILM AND COMPOSITE FABRIC AND PRODUCTION PROCESSES THEREOF

(71) Applicant: W. L. Gore & Associates, Co., Ltd., Tokyo (JP)

(72) Inventor: Takashi Imai, Okayama (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 187 days.

(21) Appl. No.: 15/137,734

(22) Filed: Apr. 25, 2016

(65) Prior Publication Data

US 2016/0236457 A1   Aug. 18, 2016

Related U.S. Application Data

(62) Division of application No. 11/814,952, filed as application No. PCT/JP2006/302201 on Feb. 2, 2006.

(30) Foreign Application Priority Data

Feb. 2, 2005   (JP) ................................. 2005-026268

(51) Int. Cl.
    *B32B 38/00*   (2006.01)
    *B32B 27/08*   (2006.01)
    (Continued)

(52) U.S. Cl.
    CPC ........ *B32B 38/0012* (2013.01); *B29C 55/005* (2013.01); *B32B 5/02* (2013.01);
    (Continued)

(58) Field of Classification Search
    CPC ..................................................... B32B 38/00
    See application file for complete search history.

(56) References Cited

U.S. PATENT DOCUMENTS 3,953,566 A   4/1976  Gore
4,187,390 A   2/1980  Gore
(Continued)

FOREIGN PATENT DOCUMENTS

JP   61-176212       11/1986
JP   2003-326661 A   11/2003
(Continued)

*Primary Examiner* — Andrew Piziali
(74) *Attorney, Agent, or Firm* — Kilpatrick Townsend & Stockton, LLP

(57) ABSTRACT

An elastic composite film provided with a sintered ePTFE film and an elastomeric resin layer, produced by continuously forming the elastomeric resin layer on at least one side of the sintered ePTFE film, continuously elongating the resulting multilayer film at less than the yield point of the expanded, sintered, porous film and at an elongation factor of 1.3 times or more in the biaxial directions, or in the uniaxial direction without contracting in the direction perpendicular to the direction of elongation, and relaxing the resulting elongated multilayer film, wherein when the composite film is elongated by 10% in the longitudinal and/or transverse direction, the tensile stress of the composite film is 2.5 N/15 mm or less, and/or the elongation percentage of the composite film in the longitudinal and/or transverse direction is 30% or more and the elongation recovery rate is 70% or more.

10 Claims, 3 Drawing Sheets

(51) Int. Cl.
  *B32B 37/14* (2006.01)
  *B29C 55/00* (2006.01)
  *B32B 5/24* (2006.01)
  *B32B 5/02* (2006.01)
  *B32B 27/32* (2006.01)
  *B32B 27/40* (2006.01)
  *A41D 31/00* (2006.01)

(52) U.S. Cl.
  CPC .............. *B32B 5/245* (2013.01); *B32B 27/08* (2013.01); *B32B 27/322* (2013.01); *B32B 27/40* (2013.01); *B32B 37/144* (2013.01); *A41D 31/0016* (2013.01); *B32B 2038/0028* (2013.01); *B32B 2307/724* (2013.01); *B32B 2307/7265* (2013.01); *B32B 2327/18* (2013.01); *Y10T 428/249991* (2015.04); *Y10T 442/3016* (2015.04); *Y10T 442/40* (2015.04); *Y10T 442/601* (2015.04)

(56) References Cited

U.S. PATENT DOCUMENTS

| | | |
|---|---|---|
| 4,194,041 A | 3/1980 | Gore et al. |
| 4,443,511 A | 4/1984 | Worden et al. |
| 4,692,369 A | 9/1987 | Nomi |
| 4,868,928 A * | 9/1989 | Norvell .................. A41D 31/02 2/272 |
| 5,321,109 A | 6/1994 | Bosse et al. |
| 5,529,830 A | 6/1996 | Dutta et al. |
| 5,948,707 A | 9/1999 | Crawley et al. |
| 2003/0054155 A1 | 3/2003 | Nomi et al. |

FOREIGN PATENT DOCUMENTS

| | | |
|---|---|---|
| WO | WO-93/21013 A1 | 10/1993 |
| WO | WO-94/22928 A1 | 10/1994 |

* cited by examiner

ELASTIC COMPOSITE FILM AND COMPOSITE FABRIC AND PRODUCTION PROCESSES THEREOF

This application is a divisional of U.S. patent application Ser. No. 11/814,952, which is a national stage application of PCT/JP2006/302201 filed on Feb. 2, 2006, which claims priority to JP2005-026268 filed on Feb. 2, 2005, the entire contents of which are expressly incorporated herein by reference in its entirety.

TECHNICAL FIELD

The present invention relates to a composite film and a composite fabric, comprising an expanded, sintered, porous polytetrafluoroethylene (PTFE) film, having elastic properties, and preferably having waterproof water vapor permeability, and production processes thereof.

BACKGROUND ART

Although sintered, porous expanded polytetrafluoroethylene (ePTFE) films and fabrics comprised of a laminate of such expanded, sintered, porous PTFE film and cloth have been proposed and used practically as waterproof, water-vapor-permeable films, they do not have adequate elastic properties.

For example, Japanese Unexamined Patent Publication No. 51-30277 (see U.S. Pat. No. 3,953,566) discloses a technology for obtaining an expanded, sintered, porous PTFE film having enhanced strength such as tensile strength as a result of expanding and increasing the porosity of a PTFE molded article, obtained by injection-molding a PTFE powder-containing paste, at a temperature equal to or below the crystal melting point of PTFE followed by sintering for 5 seconds to 1 hour at a temperature equal to or above the crystal melting point, such as a temperature of 350 to 370° C.

In addition, Japanese Unexamined Patent Publication No. 55-7483 contains a description regarding a material in which an elastomeric resin layer is formed on an expanded, sintered, porous PTFE film. Although these Japanese Unexamined Patent Publications Nos. 51-30277 and 55-7483 provide articles that can be preferably used as clothing, it is not the object of either of these publications to provide articles having elastic properties.

Japanese Unexamined Patent Publication No. 59-187845 discloses a method for imparting elastic properties by mechanically elongating a composite film of a sintered, expanded polytetrafluoroethylene (ePTFE) film and an elastomeric resin layer, or a composite in which that composite film is laminated with a cloth, beyond the yield point of the ePTFE at least by 5% or more. The ePTFE film of Japanese Unexamined Patent Publication No. 59-187845 is considered to be an expanded, sintered, porous PTFE film based on the description that it is given by the technology of U.S. Pat. No. 3,953,566.

The examples in this Japanese Unexamined Patent Publication No. 59-187845 describe that when a composite article of an ePTFE film and an elastomeric resin having a width of 12 inches (and length of 14 inches) is folded into a strip having a width of 1 to 1.25 inches and elongated two-fold (9-inch clamping interval elongated to 18 inches) in the longitudinal direction with an Instron tester, the sample width is necked to ⅜ to ½ inch. In this method, two-fold elongation treatment is possible by necking the sample during elongation treatment. Here, necking the width by about ½ during two-fold elongation means that the sample was only deformed in the direction of elongation without any substantial change in the size (total area) of the sample. In the case of having necked sample width during elongation, even if the tension during elongation is released, wrinkles form in the direction of elongation and the sample width only recovers to about 70 to 80% of the width prior to elongation. Consequently, in the case of a producing a product with this method, products can only be produced having a width that is narrower than the width of the cloth used in production, thereby increasing production cost. In addition, since wrinkles form in the product, the appearance becomes poor. In addition, in the case of having carried out elongation treatment in the longitudinal direction while preventing necking in the transverse direction under the conditions described above, due to the use of a sintered ePTFE film, breakage occurs due to elongation of roughly 20%, thereby making elongation treatment difficult.

Although elastic properties are not described in Japanese Unexamined Patent Publication No. 59-187845, it is described in Example 1 that the width is necked to about half at the stage of having elongated two-fold, and that stretch recovery immediately after is 64%. When the sample of Example 1 was actually prepared and subjected to an elongation percentage test according to the method described later, the sample width was necked to about half, the elongation percentage was 25%, and the elongation recovery rate was 65%, thus indicating that the sample cannot be said to have adequate elastic properties.

In addition, Japanese Unexamined Patent Publication No. 61-137739 discloses an elastic, water-vapor-permeable, waterproof film comprised of a composite film of an unsintered ePTFE film and an elastomeric resin. Namely, a method is disclosed for expressing elastic properties by impregnating and retaining an elastomeric resin having hydrophilic groups into an unsintered ePTFE film. Although the ePTFE film is unsintered, this is an essential requirement for expressing elastic properties. Since the ePTFE film is unsintered, a peel-off phenomenon of the surface layer occurs caused by insufficient cohesive force in the direction of thickness. It is described in this publication to the effect that, if sintering is carried out to avoid this, ductility decreases due to an absence of sliding between fibrils, and even if sintered ePTFE is laminated with other lamination material, the elastic properties of the partner lamination material, i.e. the other material, is inhibited by the sintered ePTFE, thereby causing the entire laminate to have hardly any elastic properties. In other words, it is suggested that simply impregnating and retaining an elastomeric resin in sintered ePTFE does not result in the expression of stretchability.

Moreover, Japanese Unexamined Patent Publication No. 61-137739 also describes the coating of a resin having hydrophilic groups on one or both sides for the purpose of avoiding the peel-off phenomenon of the surface layer. In the case of coating on one side, however, the lack of cohesive force on the uncoated side becomes pronounced, and even if both sides are coated, if voids remain within the ePTFE film, cohesive force is inadequate at those portions. In order to completely prevent the peel-off phenomenon of the surface layer, it is necessary to completely impregnate the inside of the ePTFE film with a resin having hydrophilic groups, which inevitably increases the thickness of the resin layer. Since resins having hydrophilic groups are hydrophilic, although water vapor permeability is expressed by dissolving moisture within the resin, as long as the moisture migrates by diffusing through a non-porous resin layer, the more water vapor permeability decreases, the greater the thickness of the non-porous resin gets. Although practical durability is inadequate unless unsintered ePTFE films are completely impregnated with a resin having hydrophilic groups to prevent the peel-off phenomenon of the surface layer and the like, complete impregnation makes it difficult to express a high level of water vapor permeability.

DISCLOSURE OF THE INVENTION

An object of the present invention is to solve the problem of the prior art by providing an elastic composite film and a composite fabric containing a sintered, porous expanded polytetrafluoroethylene (ePTFE) film, and production processes thereof. Preferably, an object of the present invention is to provide a composite film and a composite fabric containing a sintered, porous expanded polytetrafluoroethylene (ePTFE) film having waterproof, water vapor permeability, and production processes thereof. In addition, another object of the present invention is to provide a textile product containing this elastic composite fabric.

One aspect of the present invention relates to an elastic composite film provided with an expanded, sintered, porous film substantially consisting of polytetrafluoroethylene and an elastomeric resin layer formed on at least one side of the expanded, sintered, porous film; wherein, when the composite film is elongated by 10% in the longitudinal and/or transverse direction, the tensile stress of the composite film is 2.5 N/15 mm or less, and/or the elongation percentage of the composite film in the longitudinal and/or transverse direction is 30% or more and the elongation recovery rate is 70% or more. Furthermore, the elastomeric resin layer preferably contains a polyurethane resin.

Another aspect of the present invention relates to an elastic composite fabric comprising an elastic cloth laminated onto one or both sides of a composite film provided with an expanded, sintered, porous film substantially consisting of polytetrafluoroethylene and an elastomeric resin layer formed on one or both sides of the expanded, sintered, porous film; wherein, when the composite fabric is elongated by 10% in the longitudinal and/or transverse direction, the tensile stress of the composite fabric is 2.5 N/15 mm or less, and/or the elongation percentage of the composite fabric in the longitudinal and/or transverse direction is 30% or more and the elongation recovery rate is 70% or more. Furthermore, the elastomeric resin layer preferably contains a polyurethane resin.

Another aspect of the present invention relates to a textile product comprising an elastic composite fabric comprising an elastic cloth laminated onto one or both sides of a composite film provided with an expanded, sintered, porous film substantially consisting of polytetrafluoroethylene and an elastomeric resin layer formed on one or both sides of the expanded, sintered, porous film; wherein, when the composite fabric is elongated by 10% in the longitudinal and/or transverse direction, the tensile stress of the composite fabric is 2.5 N/15 mm or less, and/or the elongation percentage of the composite fabric in the longitudinal and/or transverse direction is 30% or more and the elongation recovery rate is 70% or more.

Another aspect of the present invention relates to a process for continuously producing an elastic composite film provided with an expanded, sintered, porous film substantially consisting of polytetrafluoroethylene and an elastomeric resin layer formed on one or both sides of the expanded, sintered, porous film, comprising the steps of:

(1) continuously forming the elastomeric resin layer on at least one side of the expanded, sintered, porous film;

(2) continuously elongating the multilayer film obtained in (1) above at less than the yield point of the expanded, sintered, porous film and at an elongation factor of 1.3 times or more in the biaxial directions, or in the uniaxial direction without contracting in the direction perpendicular to the direction of elongation; and (3) relaxing the elongated multilayer film obtained in (2) above.

In this production process of an elastic composite film, the elongation step is preferably carried out under heating conditions of 100 to 200° C., and preferably at an elongation rate of 5%/second or more. In addition, the relaxation step is preferably carried out under conditions of 100° C. or lower.

Another aspect of the present invention relates to a process for continuously producing an elastic composite fabric comprising an elastic cloth laminated onto at least one side of a composite film provided with an expanded, sintered, porous film substantially consisting of polytetrafluoroethylene and an elastomeric resin layer formed on one or both sides of the expanded, sintered, porous film, comprising the steps of:

(1) continuously forming the elastomeric resin layer on at least one side of the expanded, sintered, porous film;

(2) continuously laminating the elastic cloth onto one or both sides of the multilayer film obtained in (1) above, and continuously elongating the laminated fabric obtained in the lamination step at less than the yield point of the expanded, sintered, porous film and at an elongation factor of 1.3 times or more in the biaxial directions, or in the uniaxial direction without contracting in the direction perpendicular to the direction of elongation; or (2') continuously elongating the multilayer film obtained in (1) above at less than the yield point of the expanded, sintered, porous film and at an elongation factor of 1.3 times or more in the biaxial directions, or in the uniaxial direction without contracting in the direction perpendicular to the direction of elongation, and continuously laminating the elastic cloth onto one or both sides of the elongated laminated film obtained the elongation step; and, (3) relaxing the elongated laminated fabric obtained in (2) or (2') above.

In this production process of an elastic composite fabric, the elongation step is preferably carried out under heating conditions of 100 to 200° C., and preferably at an elongation rate of 5%/second or more. In addition, the relaxation step is preferably carried out under conditions of 100° C. or lower.

Another aspect of the present invention relates to an elastic composite film provided with an expanded, sintered, porous film and an elastomeric layer produced by continuously forming an elastomeric layer on at least one side of an expanded, sintered, porous film substantially consisting of polytetrafluoroethylene, continuously elongating the resulting multilayer film at less than the yield point of the expanded, sintered, porous film and at an elongation factor of 1.3 times or more in the biaxial directions, or in the uniaxial direction without contracting in the direction perpendicular to the direction of elongation, and relaxing the resulting elongated multilayer film; wherein, when the composite film is elongated by 10% in the longitudinal and/or transverse, the tensile stress of the composite film direction is 2.5 N/15 mm or less, and/or the elongation percentage of the composite film in the longitudinal and/or transverse direction is 30% or more and the elongation recovery rate is 70% or more.

Still another aspect of the present invention relates to a composite fabric provided with an expanded, sintered, porous film, an elastomeric resin layer and an elastic cloth produced by a process comprising the steps of:

(1) continuously forming the elastomeric resin layer on at least one side of the expanded, sintered, porous film substantially consisting of polytetrafluoroethylene;

(2) continuously laminating the elastic cloth onto one or both sides of the multilayer film obtained in (1) above, and continuously elongating the laminated fabric obtained in the lamination step at less than the yield point of the expanded, sintered, porous film and at an elongation factor of 1.3 times or more in the biaxial directions, or in the uniaxial direction without contracting in the direction perpendicular to the direction of elongation; or (2') continuously elongating the multilayer film obtained in (1) above at less than the yield point of the expanded, sintered, porous film and at an elongation factor of 1.3 times or more in the biaxial directions, or in the uniaxial direction without contracting in the direction perpendicular to the direction of elongation, and continuously laminating the elastic cloth onto one or both sides of the elongated multilayer film obtained the elongation step; and, (3) relaxing the elongated laminated fabric obtained in (2) or (2') above; wherein, the tensile stress of the composite fabric when elongated by 10% in the longitudinal and/or transverse direction is 2.5 N/15 mm or less, and/or the elongation percentage of the composite fabric in the longitudinal and/or transverse direction is 30% or more and the elongation recovery rate is 70% or more.

According to the present invention, a composite film, a composite fabric and a textile product having superior elongation and elongation recovery, as well as waterproof water vapor permeability in a preferable aspect thereof are provided. According to a preferable aspect, since a sintered, porous expanded polytetrafluoroethylene (ePTFE) film is used for a base material, practical durability is obtained without requiring an elastomeric resin to be completely impregnated in the ePTFE film, thereby providing a composite film, composite fabric and textile product having high water vapor permeability. In addition, according to the present invention, production processes of the composite film and composite fabric are provided. According to preferable aspects thereof, as a result of treating at an elongation treatment temperature and elongation treatment rate within specific ranges thereof, production processes are provided that allow a composite film and composite fabric having superior elongation and elongation recovery to be advantageously obtained.

BEST MODE FOR CARRYING OUT THE INVENTION

The elastic composite film of the present invention is a composite film provided with an expanded, sintered, porous film substantially consisting of polytetrafluoroethylene and an elastomeric resin layer formed on at least one side of the expanded, sintered, porous film; wherein, when the composite film is elongated by 10% in the longitudinal and/or transverse direction, the tensile stress of the composite film is 2.5 N/15 mm or less, and/or the elongation percentage of the composite film in the longitudinal and/or transverse direction is 30% or more and the elongation recovery rate is 70% or more.

Although the expanded, sintered, porous (sintered ePTFE) film substantially consisting of polytetrafluoroethylene in the present invention is obtained by drawing a polytetrafluoroethylene (PTFE) film and heating for 5 seconds to 1 hour at a temperature equal to or higher than the melting point, such as at a temperature of 350 to 370° C., this sintered ePTFE film has high porosity allowing the obtaining of high water vapor permeability, has superior durability without causing a peel-off of the surface layer, has flexibility, has extremely potent hydrophobicity, and has superior chemical and heat resistance.

Furthermore, modified PTFE obtained by copolymerizing tetrafluoroethylene-hexafluoropropylene copolymer (FEP), tetrafluoroethylene-perfluoroalkyl vinyl ether (PFA) or the like, and mixed PTFE containing up to about 20% by weight of inorganic materials or organic materials are included in the PTFE of the present invention.

Sintered ePTFE films demonstrate amorphous absorption by PTFE as a result of sintering at 780 $cm^{-1}$ in the case of measuring infrared absorption using an infrared spectrophotometer as described in, for example, "Comparative Quantitative Study on the Crystallinity of Poly(tetrafluoroethylene) including Raman, Infrared and 19F Nuclear Magnetic Resonance Spectroscopy", R. J. Lehnert, Polymer, Vol. 38, No. 7, p. 1521-1535 (1997)".

Figure 1:
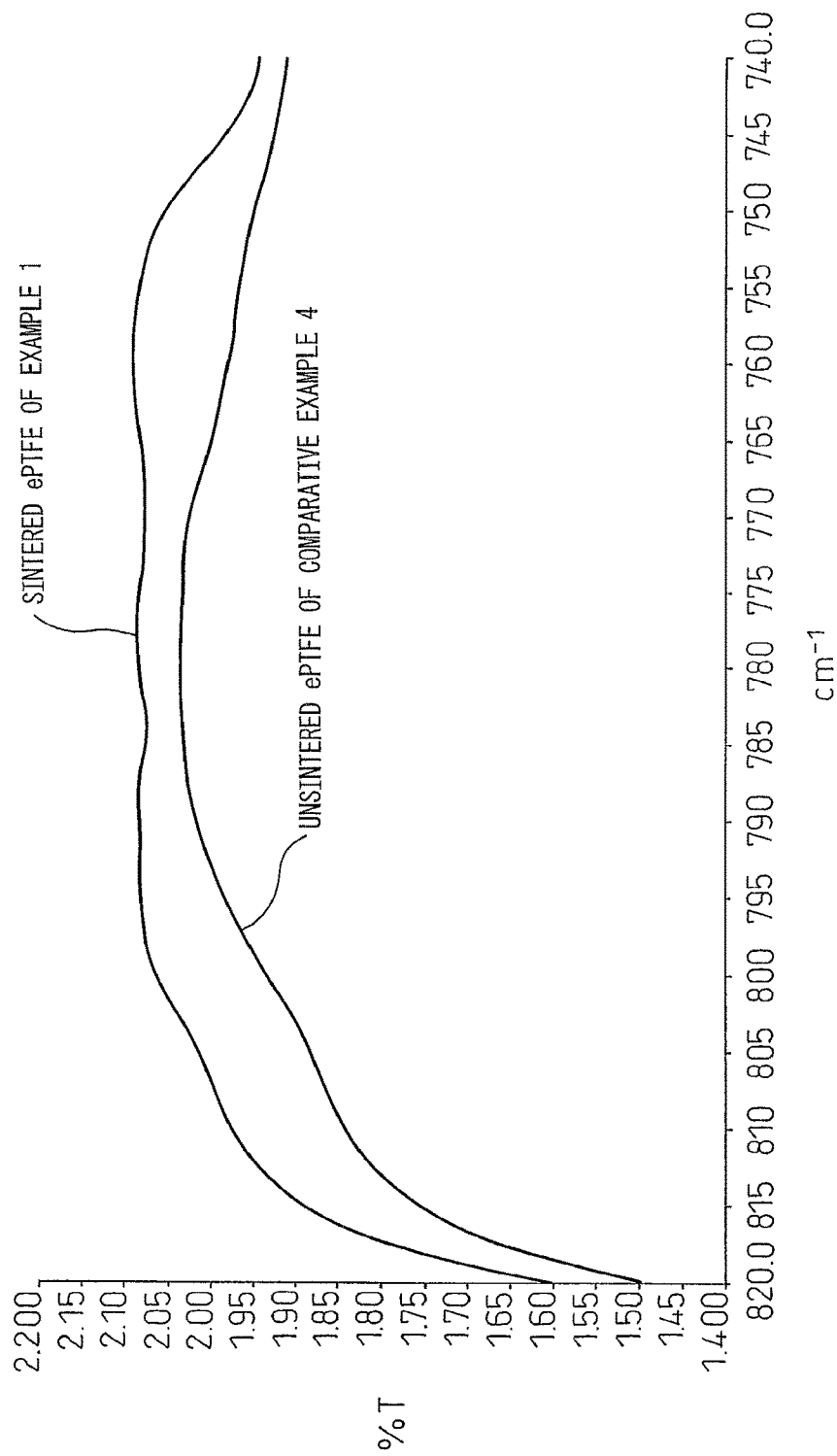
FIG. 1 is an explanatory drawing showing the infrared absorption spectra of ePTFE films.

For example, absorption is confirmed at 780 $cm^{-1}$ in the case of having measured infrared absorption of a sintered ePTFE film surface by ATR (using KRS-5 for the solute, at an incident angle of 45 degrees, a resolution of 4 $cm^{-1}$ and 20 scanning cycles) using the "Paragon 1000" infrared spectrophotometer manufactured by Perkin-Elmer. As shown by the spectra of FIG. 1, although there is no absorption observed at 780 $cm^{-1}$ in the case of an unsintered ePTFE film, absorption is confirmed for a sintered ePTFE film. In the case an elastomeric resin layer is formed on one side of an ePTFE film, when the ePTFE film side is measured and an elastomeric resin is formed on both sides of the ePTFE film, the ePTFE film side is affixed with adhesive tape and the like to the elastomeric resin layer and then peeled off the tape followed by measuring the exposed ePTFE film.

In addition, sintering may also be confirmed by using a differential scanning calorimeter (DSC). For example, differences in melting points were explained by the degree of sintering as measured with a DSC at the commemorative lecture on the 50th anniversary of the discovery of PTFE presented by Shimizu in Toronto in July 1988. It was demonstrated that melting peaks are observed for unsintered ePTFE at 345-347° C., for partially-sintered ePTFE at 330 to 340° C. and for completely sintered ePTFE at 327° C., and evaluations can also be made by DSC in the case of obtaining only the PTFE portion as a sample. Furthermore, the sintered ePTFE composed of polytetrafluoroethylene in the present invention also contained ePTFE in a partially-sintered state. Partially-sintered ePTFE is obtained by heat treating for 5 minutes to 1 hour at a temperature equal to or higher than the melting point (327° C.) of PTFE. In other words, this refers to sintering by heat treating at a temperature equal to or higher than the melting point of PTFE.

The maximum pore diameter of the sintered ePTFE film is 0.01 to 10 µm, and preferably 0.1 to 1 µm. If the maximum pore diameter of the sintered ePTFE film is less than 0.01 µm, there are difficulties in manufacturing the film, while conversely if the maximum pore diameter exceeds 10 µm, in addition to the water vapor permeability of the film decreasing, since film strength becomes weak, it becomes difficult to handle the film in the lamination and other subsequent steps, thereby making this undesirable. Furthermore, maximum pore diameter is determined according to the measurement method defined in ASTM F-316.

In addition, the porosity of the sintered ePTFE film is 50 to 98% and preferably 60 to 95%. If the porosity of the sintered ePTFE film is less than 50%, water vapor permeability decreases, while if the porosity exceeds 98%, the strength of the film decreases. Furthermore, porosity is determined by calculating according to the following equation (1) from the apparent density (p) as measured in compliance with the method for measuring apparent density defined in JIS K 6885.

$$\text{Porosity (\%)}(2.2-\rho)/2.2\times 100 \quad (1)$$

The suitable thickness of the sintered ePTFE film is 7 to 300 µm, and preferably 10 to 100 µm. If the thickness of the sintered ePTFE film is less than 7 µm, problems occur with handling during production, while if the thickness exceeds 300 µm, the flexibility of the film is impaired and water vapor permeability ends up decreasing. Film thickness is measured according to the mean thickness as measured with a dial gauge (as measured in the absence of a load other than the spring load of the main unit using a dial thickness gauge having precision of 1/1000 mm manufactured by Teclock Corp.).

A sintered ePTFE film coated with a water-repellent and/or oil-repellent polymer on the surfaces of the pores thereof as necessary is also included in the sintered ePTFE film in the present invention. In this case, examples of such polymers include polymers having a fluorine-containing side chain. A detailed description of such polymers and methods for compounding such polymers with sintered ePTFE films are disclosed in, for example, WO 94/22928.

A fluorine-containing polymer obtained by polymerizing a fluoroalkyl acrylate and/or fluoroalkyl methacrylate (in which the fluoroalkyl portion preferably has 6 to 16 carbon atoms) represented by the following general formula (I):

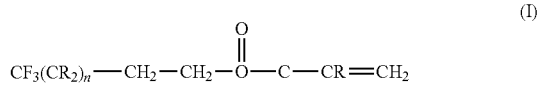

(wherein, n represents an integer of 3 to 13 and R represents a hydrogen atom or a methyl group) can be preferably used for the coating polymer. In order to coat the pores of a sintered ePTFE film using this polymer, an aqueous microemulsion (having a mean particle diameter of 0.01 to 0.5 µm) is formed using a fluorine surfactant (such as ammonium perfluorooctanate) followed by impregnating this into the pores of the sintered ePTFE film and heating. As a result, water and the fluorine surfactant are removed and the fluorine-containing polymer melts causing the surface of the pores of the sintered ePTFE film to be coated, thereby allowing the obtaining of a sintered ePTFE film maintaining continuous pores and having superior water repellency and oil repellency. In addition, examples of other polymers that can be used include "AF Polymer" (Dupont Corp.) and "Cytop" (Asahi Glass Co., Ltd.). In order to coat these polymers onto the surfaces of pores of a sintered ePTFE film, these polymers are dissolved in an inert solvent such as "Fluorinate" (Sumitomo 3M Ltd.) followed by impregnating into the sintered ePTFE film and evaporating off the solvent. As a result of coating the surfaces of the pores of the sintered ePTFE film with the aforementioned organic polymers, it becomes difficult for contaminants to penetrate inside the sintered ePTFE film when the sintered ePTFE film is contaminated by various contaminants, thereby making it possible to prevent deterioration of the hydrophobicity of the sintered ePTFE film.

The elastic composite film in the present invention has a layer of an elastomeric resin formed in the form of a coating film on at least one side of this sintered ePTFE film. Although silicone resin, fluorine rubber, NBR, epichlorhydrin, synthetic rubber such as EPDM, natural rubber, polyester resin, polyurethane resin and other elastic resins are suitably used for the elastomeric resin, in the case of using in applications requiring heat resistance, silicone resin, fluorine rubber and the like are preferable. In addition, from the viewpoint of water vapor permeability, polymer materials having hydrophilic groups such as hydroxyl, carboxyl, sulfonic acid or amino acid groups in the form of water-swellable, water-insoluble and water-vapor permeable resins are used preferably. Although specific examples thereof include at least partially crosslinked hydrophilic polymers such as polyvinyl alcohol, cellulose acetate and cellulose nitrate as well as hydrophilic polyurethane resins, hydrophilic polyurethane resins are particularly preferable in consideration of factors such as chemical resistance, processability and water vapor permeability. Furthermore, two or more types of the aforementioned resins may be used as a mixture, or they may be mixed with inorganic or organic fillers for the purpose of, for example, improving durability or imparting antistatic properties.

Examples of hydrophilic polyurethane resins used include polyester-based and polyether-based polyurethane and prepolymers containing hydrophilic groups such as hydroxyl, amino, carboxyl, sulfonic acid or oxyethylene groups, and diisocyanates or triisocyanates having two or more isocyanate groups or adducts thereof can be used alone or in the form of a mixture as a crosslinking agent for adjusting the melting point (softening point) of the resin. In addition, dipolyols, tripolyols, diamines or triamines having two or more functional groups can be used as curing agents for prepolymers having an isocyanate terminal. Two functional groups are preferable to three functional groups for maintaining a high level of water vapor permeability.

The thickness of the elastomeric resin layer of the elastic composite film in the present invention is preferably 5 to 500 µm and more preferably 10 to 300 µm. If the thickness of the elastomeric resin layer is less than 5 µm, the stretch recovery of the elastic composite film becomes inadequate, while if the thickness exceeds 300 µm, the elastic composite film becomes hard and heavy. In the case of using the elastic composite film in applications requiring water vapor permeability, the thickness of the elastomeric resin layer is preferably 5 to 100 µm and more preferably 10 to 70 µm. If the thickness of the elastomeric resin layer is less than 5 µm, the stretch recovery of the elastic composite film becomes inadequate, while if the thickness exceeds 100 µm, water vapor permeability becomes inadequate.

In addition, the elastomeric resin layer formed on at least one side of the sintered ePTFE film preferably partially penetrates inside the sintered ePTFE film in terms of being able to prevent the peel-off of the elastomeric resin layer and increasing durability. In the case of using a water vapor-permeable resin for the elastomeric resin, the thickness of the portion of the water vapor-permeable resin that penetrates inside the sintered ePTFE film is preferably 3 to 30 µm and most preferably 5 to 20 µm from the viewpoints of water vapor permeability, softness (texture) and durability. If the thickness is less than 3 µm, durability becomes inadequate in terms of practical use, while if the thickness exceeds 30 µm, water vapor permeability becomes excessively low. Furthermore, the thickness of polyurethane resin layers is determined by visually measuring the average thickness using an electron micrograph scale (scale used to represent length) from a cross-sectional electron micrograph (1000 to 3000×).

In the case of using the elastic composite film in the present invention in applications requiring water vapor permeability such as textile products, the water vapor permeability thereof is preferably 2000 to 100000 g/m$^2$·24 hr and more preferably 3000 to 70000 g/m$^2$·24 hr. Furthermore, water vapor permeability refers to the value obtained by converting a measured value according to method B-2 defined in JIS L 1099 to the value for 24 hours.

In the elastic composite film in the present invention, layers of an elastomeric resin may be formed in the form of a coating on both sides of the sintered ePTFE film. In this case, the previously described elastomeric resins can be used, and the same elastomeric resin may be used on both sides or different elastomeric resins may be used on each side according to the application.

The elastic composite film in the present invention is characterized by the tensile stress when elongated by 10% in the longitudinal direction and/or transverse direction of the composite film being 2.5 N/15 mm or less, and/or the elongation percentage in the longitudinal direction and/or transverse direction of the composite film being 30% or more and the elongation recovery rate being 70% or more. Namely, the elastic composite film in the present invention satisfies at least one of the requirements consisting of the tensile stress when elongated by 10% being 2.5 N/15 mm or less, the elongation percentage being 30% or more, and the elongation recovery rate being 70% or more.

A composite film that satisfies all of the ranges of tensile stress, elongation percentage and elongation recovery rate is most preferable in order to achieve practical elastic properties. Depending on the case, elongation percentage and elongation recovery rate may be within the prescribed ranges, while tensile stress when elongated by 10% may be outside the aforementioned range. In addition, the tensile stress when elongated by 10% may be within the aforementioned range, while the elongation percentage and elongation recovery rate may be outside the prescribed ranges. The prescribed requirements are satisfied in at least the longitudinal direction or transverse direction of the composite film.

With respect to elongation percentage and elongation recovery rate, a composite film in which the elongation percentage 35% or more and the elongation recovery rate is 80% or more is more preferable, while a composite film in which the elongation percentage is 40% or more and the elongation recovery rate is 90% or more is particularly preferable, in terms of demonstrating more superior elastic properties. Furthermore, elongation percentage was determined by measuring elongation percentage after applying a 300 g load for 1 minute in compliance with method B defined in JIS L 1096, while elongation recovery rate was measured by using a time of 1 minute for the time elapsed after removing the load in compliance with method B-1 defined in JIS L 1096.

With respect to the tensile stress of the elastic composite film of the present invention when elongated by 10%, a composite film in which the tensile stress is 2 N/15 mm or less is more preferable, while a composite film in which the tensile stress is 1.5 N/15 mm or less, is particularly preferable in terms of demonstrating superior (easily stretched) elastic properties. Furthermore, the tensile stress is measured by carrying out a tensile test on a sample having a width of 15 mm at a stretching speed of 200 mm/min.

A low tensile stress during elongation (meaning that the resistance during elongation is low enabling the film to be stretched with a little force) is also an important factor for perceiving elastic properties. For example, although a composite film having an elongation percentage of 20% and tensile stress of 3.25 N/15 mm during 10% elongation may be perceived to have inferior elastic properties, a composite film having the same elongation percentage but having a tensile stress of 1.85 N/15 mm during 10% elongation is able to be perceived as being elastic due to its greater ease of stretching.

The production process of the elastic composite film in the present invention is a process of continuously producing the elastic composite film described above, comprising the steps of:

(1) continuously forming the elastomeric resin layer on at least one side of an expanded, sintered, porous film substantially consisting of polytetrafluoroethylene (ePTFE);

(2) continuously elongating the multilayer film obtained in (1) above at less than the yield point of the sintered ePTFE film and at an elongation factor of 1.3 times or more in the biaxial directions, or continuously elongating in the uniaxial direction without contracting in the direction perpendicular to the direction of elongation; and (3) relaxing the elongated multilayer film obtained in (2) above.

In the production process of this elastic composite film, impregnation can be used as the method for continuously forming a layer of an elastomeric resin, and preferably a hydrophilic polyurethane resin, on one side of a multilayer structure of a sintered ePTFE film. There are no particular limitations on the method for impregnating the hydrophilic polyurethane resin, and the polyurethane resin can be coated onto the sintered ePTFE film with, for example, a roll coater by making the resin into a solution with a solvent and forming a melt by heating to create a coating liquid. The viscosity of the coating liquid suitable for impregnation is preferably 20000 cps or less, and more preferably 10000 cps or less at the coating temperature. In the case of making the resin into a solution with a solvent, although dependent on the solvent composition, if the viscosity is excessively low, the solution diffuses throughout the entire sintered ePTFE film after coating, making the entire film hydrophilic. Since this causes problems in terms of waterproofness and results in an increase in the impregnated amount of hydrophilic polyurethane resin, the resin layer ultimately becomes excessively thick, and since a probability of preventing the obtaining of a high degree of moisture permeability becomes high, the viscosity is preferably maintained at 500 cps or more. A B-type viscometer manufactured by Toki Sangyo Co., Ltd., for example, is used to measure viscosity. Since the porous structure of the sintered ePTFE film and the impregnability of the impregnated hydrophilic polyurethane resin vary according to surface tension, pore size, temperature and pressure, and the like, conditions are required that enable the hydrophilic polyurethane resin to form a thin coating on the surface of the sintered ePTFE film with causing impregnation of the hydrophilic polyurethane resin and without causing the hydrophilic polyurethane resin to diffuse throughout the entire sintered ePTFE film. The conditions for viscosity of a coating liquid containing a hydrophilic polyurethane resin as previously described are effective for a sintered ePTFE film having a maximum pore size of about 0.2 μm.

The production process of the elastic composite film of the present invention is characterized by elongation treatment while preventing necking. Namely, the production process is characterized by elongating in the direction of expansion while maintaining a constant dimension of the film perpendicular to the direction of expansion, or while elongating, at or below the yield point of the sintered ePTFE film.

Figure 2:
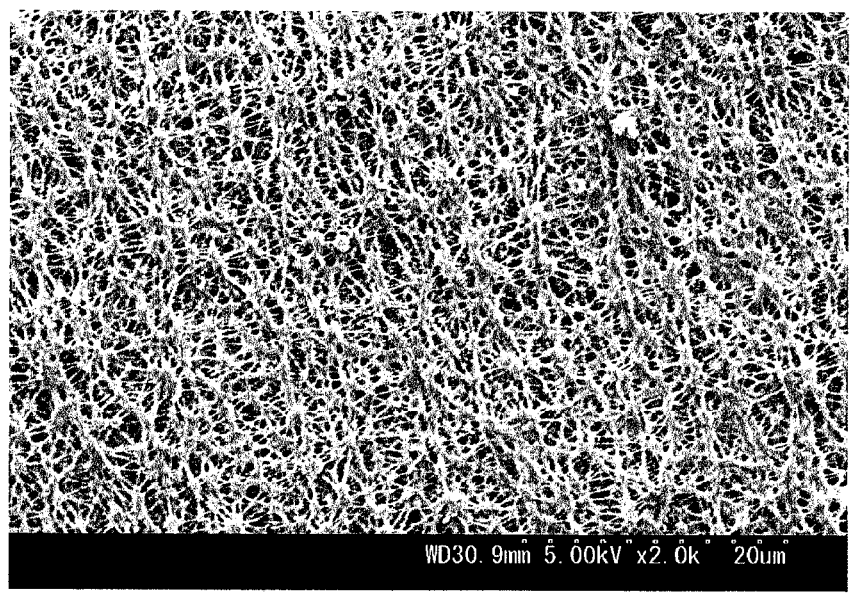
FIG. 2 is an explanatory drawing showing an electron micrograph of the surface of a sintered ePTFE film prior to elongation treatment.

An example of an electron micrograph taken at a magnification of 2000× of the surface of sintered ePTFE prior to this elongation treatment is shown in FIG. 2 for reference purposes. Nodes and fibrils extending from the nodes can be observed in FIG. 2. For example, if a sintered ePTFE film is elongated in the transverse direction without fixing the dimension in the longitudinal direction, the shapes of the pores are deformed into long, narrow shapes in the transverse direction, thereby causing elongation in the transverse direction and necking in the longitudinal direction. In contrast, elongating without causing necking as in the present invention increases the total surface area of the sample by elongation treatment, thus indicating that fibrils of sintered ePTFE are newly extended from the nodes or that existing fibrils are further elongated. Although PTFE exhibits strong plastic deformity and is itself not elastic, it returns to nearly its original shape (dimensions) in the relaxation step due to the elasticity of the impregnated elastomeric resin layer. As a result of elongating the sintered ePTFE followed by returning to its original dimensions in the relaxation step (as it is a continuous processing without causing necking), together with the elasticity of the elastomeric resin layer, it becomes possible for the first time to achieve an elongation percentage of 30% or more and elongation recovery rate of 70% or more, while the tensile stress when elongating by 10% is 2.5 N/15 mm or less. In this manner, the production process of the present invention and the elastic composite film obtained thereby are essentially different from the method described in the aforementioned Japanese Unexamined Patent Publication No. 59-187845 with respect to the occurrence of fibril growth and the extension of new fibrils.

The dimensional recovery rate of the elongated multilayer film before and after the elongation and relaxation steps in the production process of the present invention is 80% or more and preferably 85% or more. If the dimensional recovery rate of the elongated multilayer film is less than 80%, the elastic properties of the produced elastic composite film are inadequate. The dimensional recovery rate is determined by calculating using the following equation (2) from the dimension of the multilayer film before elongation treatment (L1), the elongating dimension during elongation treatment (L2), and the dimension of the elastic composite film following relaxation of the elongated multilayer film (L3).

$$\text{Dimensional recovery rate (\%)}(L2-L3)/(L2-L1)\times 100 \quad (2)$$

In order to perceive desired elastic properties, it is necessary for the elongation percentage and elongation recovery rate to be high, and the elongation stress during 10% elongation to be low. As a result, elongation (ease of stretching) and recovery (ease of shrinking) can be perceived at low stress. In order to elongate sintered ePTFE film, a desired elongation factor can be achieved by elongating while heating to a certain degree. Based on the balance between elongation and recovery, the elongation treatment temperature is preferably 100 to 200° C. and particularly preferably 120 to 180° C.

If elongation treatment is carried out at an elongation treatment temperature above 200° C., the elastomeric resin is set in the elongated state and dimensional recovery following completion of elongation becomes poor, thus indicating the absence of elastic properties. In addition, if elongation treatment is carried out at an elongation treatment temperature below 100° C., since a sintered ePTFE film is used, slipperiness between fibrils and the extension of new fibrils from the nodes also become poor, eventually preventing elongation to a desired elongation factor.

If a composite film of a sintered ePTFE film and elastomeric resin having a rupture elongation percentage of 200% of the present invention is elongated under conditions of, for example, an elongation factor of 1.4 times and elongation speed of 50%/sec at a temperature of 150° C., and then allowed to recover (relax) by releasing tension after elongation, a film having superior elastic properties is obtained having an elongation percentage of 30%, elongation recovery rate of 90% and elongation stress of 1.85 N/15 mm when elongated by 10%. If the same film is elongated under conditions of an elongation factor of 1.4 times and elongation speed of 50%/sec at a temperature of 90° C., the film breaks during the course of elongation and cannot be elongated. In addition, a film obtained by elongating the same film at an elongation factor of 1.4 times and elongation speed of 50%/sec at a temperature of 210° C. followed by allowing the film to recover by releasing tension after elongation has inferior elastic properties, having an elongation percentage of 15%, elongation recovery rate of 38% and elongation stress of 2.8 N/15 mm when elongating by 10%.

Differences in the recovery rate of film dimensions following the relaxation step are also observed depending on the elongation speed. If the elongation speed is excessively slow, a considerable amount of time is required to elongate to a predetermined elongation factor, and as a result, the thermosetting time of the film becomes long and elastic properties becomes poor, similar to elongation treatment at high temperatures. An elongation speed of 5%/sec or more is preferable, and that of 10%/sec or more is particularly preferable.

The ease of stretching of sintered ePTFE films in the longitudinal and transverse directions can be adjusted according to the balance of the longitudinal and transverse expansion factors. Composite films of the sintered ePTFE film and elastomeric resin also inherit the balance of ease of stretching of the sintered ePTFE film serving as the base material. For example, a sintered ePTFE film easily elastic in the transverse direction is obtained by lowering the expansion factor in the transverse direction relative to the elongation factor in the longitudinal direction. Although the present invention does not limit the direction of stretching ease, since fabrics that stretch in the transverse direction typically have a larger number of types and are inexpensive, a sintered ePTFE film that stretches easily in the transverse direction is used preferably.

In the production process of the elastic composite film of the present invention, the elongation step is preferably carried out under heating conditions of 100 to 200° C. and at an elongation speed of 5%/sec or more. In the case of elongating in the transverse direction only while fixing the longitudinal direction, the elongation factor in the transverse direction is preferably 1.3 times or more and particularly preferably 1.4 times or more. In addition, in the case of elongating in the longitudinal direction only while fixing the transverse direction, the elongation factor in the longitudinal direction is preferably 1.3 times or more and particularly preferably 1.4 times or more, while in the case of elongating biaxially, the elongation factor in the longitudinal direction is preferably 1.3 times or more and particularly preferably 1.4 times or more, and the elongation factor in the transverse direction is preferably 1.3 times or more and particularly preferably 1.4 times or more. If the elongation factor falls below the aforementioned ranges, there is the risk of the elastic properties of the resulting elastic composite film being inadequate. Although the elongation factor is preferably as high as possible provided the sintered ePTFE film does not break, it normally has an upper limit of about 2 times in the case of elongating uniaxially and an upper limit of about 1.7 times in the case of elongating biaxially.

In the production process of the elastic composite film of the present invention, the relaxation step is preferably carried out under conditions of 100° C. or lower, and particularly preferably under conditions of room temperature to 80° C. If the relaxation step is carried out at a temperature above 100° C., since the dimensional recovery rate following the relaxation step falls below 80%, elastic properties becomes inadequate. There are no particular limitations on the method of relaxation, and the elastic composite film may be allowed to contract naturally by releasing the tension applied thereto.

The elastic composite fabric of the present invention is a composite fabric in which an elastic cloth is laminated onto one or both sides of the elastic composite film described above, wherein, when the composite fabric is elongated by 10% in the longitudinal direction and/or transverse direction, the tensile stress of the composite fabric is 2.5 N/15 mm or less, and/or the elongation percentage of the composite fabric in the longitudinal direction and/or transverse direction is 30% or more and the elongation recovery rate is 70% or more. The tensile stress referred to here is basically the same as in the case of the aforementioned elastic composite film with respect to elongation percentage and elongation recovery rate.

Although any elastic cloth can be used provided it is able to fulfill the role of a protective layer of an elastic composite film and has elastic properties, woven cloths, knits, non-woven fabrics, nets and the like composed of synthetic fibers or natural fibers are preferable. Examples of preferably used synthetic fibers include polyamide, polyester, polyurethane, polyolefin, polyvinyl chloride, polyvinylidene chloride, polyfluorocarbon and polyacrylic fibers. In addition, cloths such as elastic polyurethane-based Spandex fibers, cloths composed of special polyester (PBT) fibers, cloths partially combining these fibers, and cloth referred to as mechanical stretch cloth in which special "twisting" is applied to the thread are used preferably as they have excellent elastic properties. Also, knit and the like are preferably used since they have structural elastic properties. Examples of natural fibers include cotton, hemp, wool and silk.

In the case of laminating an elastic composite film and an elastic cloth, a method to form a two-layer structure in which the cloth is laminated onto one side of the elastic composite film, or a method to form a three-layer structure in which the cloth is laminated onto both sides of the elastic composite film can be used.

The process for continuously producing an elastic composite fabric in the present invention comprises the steps of:

(1) continuously forming the elastomeric resin layer on at least one side of an expanded, sintered, porous (sintered ePTFE) film substantially consisting of polytetrafluoroethylene;

(2) continuously laminating an elastic cloth onto one or both sides of the multilayer film obtained in (1) above, and continuously elongating the laminated fabric obtained in the lamination step at less than the yield point of the sintered ePTFE film and at an elongation factor of 1.3 times or more in the biaxial directions, or continuously elongating it in the uniaxial direction without contracting in the direction perpendicular to the direction of elongation; or (2') continuously elongating the multilayer film obtained in (1) above at less than the yield point of the sintered ePTFE film and at an elongation factor of 1.3 times or more in the biaxial directions, or continuously elongating it in the uniaxial direction without contracting in the direction perpendicular to the direction of elongation, and continuously laminating the elastic cloth onto one or both sides of the elongated multilayer film obtained the elongation step; and, (3) relaxing the elongated laminated fabric obtained in (2) or (2') above.

Here, the method for forming the elastomeric resin layer on the surface of the sintered ePTFE film is basically the same as in the aforementioned production process of an elastic composite film. In addition, the step for elongating the laminated fabric and the step for relaxing the elongated laminated fabric are basically the same as the previously described methods.

Elongation treatment may be carried out after laminating the elastic cloth onto the multilayer film in which the elastomeric resin layer has been formed on the sintered ePTFE film, or the elastic cloth may also be laminated after carrying out elongation treatment on the multilayer film.

Lamination of the elastic composite film and elastic cloth can be carried out using a known method. For example, a method in which an adhesive is applied to the elastic composite film with a roller containing a gravure pattern followed by aligning the elastic cloth thereon and press-bonding the elastic cloth with a roller, a method in which an adhesive is sprayed onto the elastic composite film followed by aligning the elastic cloth thereon and press-bonding with a roller, or a method in which the elastic composite film and elastic cloth are superimposed followed by heat fusing with a heated roller, can be used.

Lamination of the elastic cloth and elastic composite film is preferably obtained by adhesion. Various types of adhesives known in the prior art can be used as the adhesive for this purpose provided it does not easily decrease in adhesive strength under ordinary conditions of use. Non-water-soluble adhesives are used in general. Examples of such non-water-soluble adhesives include thermoplastic resins as well as thermosetting resins cured by heat, light and the like. Specific examples of non-water-soluble adhesives that can be suitably used include various types of resins such as polyester, polyamide, polyurethane, silicone, polyacrylic, polyvinyl chloride, polybutadiene, rubber and polyolefin-based resins. Polyurethane-based resins in the form of curing reaction-type hot melt adhesives are used particularly preferably. Although the curing reaction-type hot melt adhesives in this case refers to those that are a solid at ambient temperatures and have a low-viscosity liquid when melted by heating, by coating in a liquid state and then maintaining in this state, or by further heating, a curing reaction occurs resulting in an adhesive in the form of a high-viscosity liquid or solid. In this case, the viscosity of the melt when melted by heating, namely prior to coating onto a liner fabric, is 500 to 30000 cps and preferably 500 to 3000 cps. On the other hand, the viscosity of the melt when the melt is obtained in the form of a high-viscosity liquid, namely when the film and liner fabric are laminated with the melt, is 500 to 20000 cps and preferably 10000 cps or higher. Furthermore, the curing reaction of the melt proceeds in the presence of a curing catalyst, curing agent and moisture.

A preferable example of the aforementioned curing reaction-type adhesive is a urethane polymer that undergoes a curing reaction due to the presence of humidity (moisture). This urethane polymer can be obtained by an addition reaction of (I) a polyol component such as a polyester polyol or polyether polyol, and (II) a polyisocyanate component such as an aliphatic or aromatic diisocyanate or triisocyanate such as tolylene diisocyanate (TDI), methylene bisphenyl diisocyanate (MDI), xylene diisocyanate or isophorone diisocyanate. In this case, this urethane polymer has an isocyanate group on the terminal thereof and undergoes a curing reaction in the presence of humidity. In this urethane polymer, the melting temperature is slightly higher than room temperature, 50° C. or higher and preferably 80 to 150° C. This type of urethane polymer can be acquired commercially under, for example, the trade name "Bond-Master" from Nippon NSC Ltd. This polymer becomes a melt having a viscosity enabling coating processing onto a base material as a result of being heated to 70 to 150° C., and after laminating an elastic cloth and elastic composite film using this melt, the polymer changes to a semi-solid state as a result of cooling to about room temperature, thereby preventing excessive penetration and diffusion of the adhesive into the fabric while also being cured by moisture in the air, thereby allowing the obtaining of soft yet powerful adhesion.

The surface area of adhesion or fusion-bonding in the case of carrying out the lamination described above is 3 to 90% and preferably 5 to 80%. If the surface area is less than 3%, the adhesive or fusion-bonding strength between the elastic composite film and elastic cloth is unable to be adequately obtained, while if the surface area exceeds 90%, the texture of the resulting elastic composite fabric becomes hard and water vapor permeability is also inadequate.

A textile product of the present invention comprises the elastic composite fabric described above. Textile products refer to products containing cloth as a constituent feature thereof, and examples include clothing products such as garments, caps, gloves and socks, bedding products such as futons, sheets and sleeping bags, film structures such as tents, and bags such as portfolios. For example, in the case of rainwear provided with water vapor permeability that uses a bi-layer structured, elastic composite fabric of the present invention, the rainwear is used with the elastic cloth side on the outside and the elastomeric resin layer side on the inside next to the body.

If the sintered ePTFE film side is used on the inside next to the body, water vapor generated from the body passes through the pores of the sintered ePTFE film, penetrates to the inside of the elastomeric resin layer by adhering to the surface of the elastomeric resin penetrating inside the pores where it diffuses, and then evaporates from the surface of the elastomeric resin layer. Consequently, the substantial effective film surface area of the elastomeric resin at the surface to which water vapor adheres and penetrates is limited to the pores thereof. Consequently, water vapor permeability decreases as compared with using the elastomeric resin on the inside next to the body. In addition, as a result of using the elastomeric resin side on the inside next to the body, perspiration, sebum and other contaminants generated from the body are cut off at the surface of the elastomeric resin layer, thereby demonstrating the effect of being able to prevent contamination of the sintered ePTFE film by contaminants.

Since the cloth side is normally used being exposed on the outer surface of rainwear, when the cloth exposed on the outer surface absorbs water, a water film is formed on the surface of the rainwear, which not only inhibits water vapor permeability of the elastic composite fabric, but also increases the sheet weight, decreasing comfort. Thus, the outer surface of the rainwear is preferably subjected to water repellency treatment with fluorine-based water repellent agent or silicone-based water repellent agent and the like.

Although the following provides a more detailed explanation of the present invention through working examples thereof, the present invention is not limited to these working examples.

Example 1

Ethylene glycol was added to a hydrophilic polyurethane resin (Dow Chemical Co., trade name: Hipore 2000) at a ratio in which the equivalent weight ratio of NCO/OH is 1, followed by the addition of toluene so that the concentration of the polyurethane pre-polymer was 90% by weight, and mixing and stirring well to prepare a coating liquid. This coating liquid was coated onto a sintered ePTFE film manufactured by Japan Gore-Tex Inc. (thickness: 50 μm, maximum pore diameter: 0.3 μm, porosity: 80%, rupture elongation percentage in transverse direction as determined in a tensile test: 260%), and cured by heating to obtain a multilayer film in which the thickness of the polyurethane resin layer was 25 μm (thickness of impregnated portion: 15 μm, thickness of surface portion: 10 μm). Next, this multilayer film was subjected to continuous elongation treatment in the transverse direction under the conditions shown in Table 1 with an apparatus having a tenter that spreads apart in a heater oven, the film was removed from the tenter immediately after elongation, and then continuously wound while allowing to contract naturally at room temperature. Furthermore, the film was moved at a constant speed so as not to substantially elongate the film in the longitudinal direction.

More specifically, the aforementioned multilayer film was subjected to elongation treatment according to the previously described method at an elongation temperature of 150° C., elongation factor in the transverse direction of 1.5 times, and elongation speed of 6%/sec to produce an elastic composite film. The elongation percentage and elongation recovery rate of the resulting elastic composite film were measured according to the methods previously described.

As a result, as shown in Table 1, a film having superior elastic properties was obtained having an elongation percentage of 35% in the transverse direction, an elongation recovery rate of 85%, and stress of 1.5 N/15 mm during 10% elongation. Furthermore, the elongation percentage of the composite film in the transverse direction prior to elongation treatment was 10%, the elongation recovery rate was 65% and the stress during 10% elongation was 3.0 N/15 mm.

Comparative Example 1—Effect of Elongation Speed

A composite film was produced under the same conditions as Example 1 with the exception of changing the elongation speed to 1%/sec. The resulting composite film had poor elastic properties, with an elongation percentage in the transverse direction of 19%, elongation recovery rate of 80% and stress of 2.6 N/15 mm during 10% elongation. The evaluation results are also shown in Table 1.

Comparative Example 2—Effect of Elongation Temperature

A composite film was produced under the same conditions as Example 1 with the exception of using an elongation temperature of 220° C. The elongation percentage of the resulting composite film in the transverse direction was 5%, the elongation recovery rate was 50%, and the stress during 10% elongation was 2.7 N/15 mm. If the elongation temperature is excessively high even for the same elongation speed, the effect of thermosetting increases, and this resulted in a film having inadequate elastic properties. The evaluation results are also shown in Table 1.

Comparative Example 3—Effect of Elongation Temperature

When a multilayer film was subjected to elongation treatment under the same conditions as Example 1 with the exception of using an elongation temperature of 90° C., the multilayer film ruptured and elongation treatment was unable to be carried out.

Example 2

An elastic composite film was produced under the same conditions as Example 1 with the exception of using an elongation temperature of 170° C., elongation factor of 1.6 times in the transverse direction, and elongation speed of 13%/sec. The evaluation results are shown in Table 1. A film having superior elastic properties was obtained having an elongation percentage of 42% in the transverse direction, an elongation recovery rate of 85% and stress of 1.4 N/15 mm during 10% elongation, by increasing the elongation factor and setting a faster elongation speed.

tion and elongation recovery rate of 93%. In addition, the adhesive durability between the film and liner fabric of this laminate was evaluated based on the presence or absence of the peel-off by visual observation of a sample following 100 hours of continuous agitation laundering using tap water containing no detergent at a bath ratio of 1/60, bath temperature of 45° C. or lower and in the heavy-duty mode using a type B home-use washing machine as described in ISO 6330 (Kenmore Model 110.20912, Sears Roebuck & Co.). As a result, there was no peel-off.

Comparative Example 4

An elastic composite film was produced under the same conditions as Example 1 with the exception of using an unsintered ePTFE film. An elastic composite fabric was produced under the same conditions as Example 3 using the resulting elastic composite film. As a result of the aforementioned continuous laundering test on this elastic composite fabric, a portion of the elastic composite fabric peeled off. Observation of the separated portion revealed that the peel-off was caused by aggregation and destruction of the ePTFE layer.

Example 4

A bi-layer structured, laminated fabric, obtained by laminating a knit cloth (Nylon/Spandex blend: 75/25, gauge: 28 G, weight: 58 g/m$^2$, transverse direction elongation percentage: 150%, elongation recovery rate: 95%) onto the sintered ePTFE film side of the multilayer film (not subjected to elongation treatment) of Example 1 under the same conditions as Example 3, was subjected to elongation treatment in the same manner as Example 1 with the exception of using an elongation temperature of 110° C., transverse direction elongation factor of 1.8 times and elongation speed of 20%/sec. As a result of evaluating the resulting elastic composite fabric, the fabric had superior elastic properties,

TABLE 1

| No. | Elongation temperature (° C.) | Elongation factor in transverse direction (times) | Elongation speed (%/sec) | Elongation percentage in transverse direction (%) | Elongation recovery rate in transverse direction (%) | Stress during 10% elongation (N/15 mm) |
|---|---|---|---|---|---|---|
| Ex. 1 | 150 | 1.5 | 6 | 35 | 85 | 1.5 |
| Comp. ex. 1 | 150 | 1.5 | 1 | 19 | 80 | 2.6 |
| Comp. ex. 2 | 220 | 1.5 | 6 | 5 | 50 | 2.7 |
| Ex. 2 | 170 | 1.6 | 13 | 42 | 85 | 1.4 |

Example 3

An adhesive manufactured by Nippon NSC Ltd. ("BondMaster") was transferred in the form of dots on the sintered ePTFE film side of the elastic composite film of Example 2 using a gravure roller having a transfer surface area of 40%, followed by laminating a knit cloth (Nylon/Spandex blend: 75/25, gauge: 28 G, weight: 58 g/m$^2$, transverse direction elongation percentage: 150%, elongation recovery rate: 95%) onto the transferred side, and applying pressure to obtain a bi-layer structured, elastic composite fabric. The resulting elastic composite fabric had elastic characteristics of an elongation percentage of 35% in the transverse direcdemonstrating an elongation percentage of 45% in the transverse direction, elongation recovery rate of 92% and stress of 1.7 N/15 mm during 10% elongation.

Example 5

A bi-layer structured, laminated fabric was produced by laminating a knit cloth (Nylon/Spandex blend: 75/25, gauge: 28 G, weight: 58 g/m$^2$, transverse direction elongation percentage: 150%, elongation recovery rate: 95%) onto the sintered ePTFE film side of the multilayer film (not subjected to elongation treatment) of Example 1 under the same conditions as Example 3. Moreover, the same knit cloth was laminated onto the other side of the multilayer film in the same manner to obtain a tri-layer structured, laminated fabric. This laminated fabric was subjected to elongation treatment in the same manner as Example 4 As a result of evaluating the resulting elastic composite fabric, the fabric had superior elastic properties, demonstrating an elongation percentage of 35% in the transverse direction, elongation recovery rate of 95% and stress of 2.0 N/15 mm during 10% elongation.

Example 6

A bi-layer structured, laminated fabric was produced by laminating a woven cloth (2/2 twill structure composed of Nylon twisted yarn, density: 170×160 threads/inch, weight: 82 g/m$^2$, transverse direction elongation percentage: 35%, elongation recovery rate: 90%) onto the sintered ePTFE film of the laminated film (not subjected to elongation treatment) of Example 1 under the same conditions as Example 3. This laminated fabric was subjected to elongation treatment in the same manner as Example 1 with the exception of using an elongation temperature of 150° C., transverse direction elongation factor of 1.4 times and elongation speed of 20%/sec. A fabric having superior elastic properties was obtained having an elongation percentage in the transverse direction of 25%, an elongation recovery rate of 88%, and stress of 1.96 N/15 mm during 10% elongation.

Example 7

Figure 3:
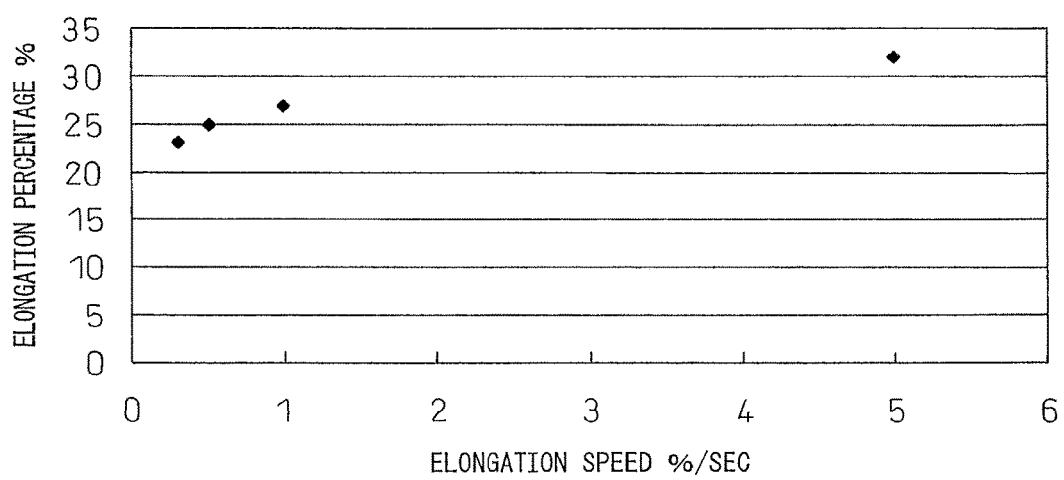
FIG. 3 is an explanatory drawing showing the effect of elongation rate during elongation treatment of composite films of the present invention.

The multilayer film of Example 1 was elongated by 1.5 times at 170° C. The elongation speeds at that time were 5%/sec, 1%/sec, 0.5%/sec or 0.3%/sec. The other conditions were the same as in Example 1. The results of evaluating the resulting composite films are shown in FIG. 3. Films were obtained that demonstrated a higher elongation percentage at the faster the elongation speed.

The invention claimed is:

1. A process for continuously producing an elastic composite film provided with an expanded, sintered, porous film substantially consisting of polytetrafluoroethylene and an elastomeric resin layer formed on at least one side of the expanded, sintered, porous film, comprising the steps of:
 (1) continuously forming the elastomeric resin layer on at least one side of the expanded, sintered, porous film;
 (2) continuously elongating the multilayer film obtained in (1) above at less than the yield point of the expanded, sintered, porous film and at an elongation factor of 1.3 times or more in the biaxial directions, or in the uniaxial direction without contracting in the direction perpendicular to the direction of elongation; and
 (3) relaxing the elongated multilayer film obtained in (2) above.

2. The process according to claim 1, wherein the elongation step is carried out under heating conditions of 100 to 200° C.

3. The process according to claim 1, wherein the elongation step is carried out at an elongation speed of 5%/sec or more.

4. The process according to claim 1, wherein the relaxation step is carried out under conditions of 100° C. or lower.

5. The process according to claim 1, wherein the elastomeric resin layer contains a polyurethane resin.

6. A process for continuously producing an elastic composite fabric comprising an elastic cloth laminated onto one or both sides of a composite film provided with an expanded, sintered, porous film substantially consisting of polytetrafluoroethylene and an elastomeric resin layer formed on at least one side of the expanded, sintered, porous film, comprising the steps of:
 (1) continuously forming the elastomeric resin layer on at least one side of the expanded, sintered, porous film;
 (2) continuously laminating the elastic cloth onto one or both sides of the multilayer film obtained in (1) above, and continuously elongating the laminated fabric obtained in the lamination step at less than the yield point of the expanded, sintered, porous film and at an elongation factor of 1.3 times or more in the biaxial directions, or in the uniaxial direction without contracting in the direction perpendicular to the direction of elongation; or
 (2') continuously elongating the multilayer film obtained in (1) above at less than the yield point of the expanded, sintered, porous film and at an elongation factor of 1.3 times or more in the biaxial directions, or in the uniaxial direction without contracting in the direction perpendicular to the direction of elongation, and continuously laminating the elastic cloth onto one or both sides of the elongated multilayer film obtained the elongation step; and,
 (3) relaxing the elongated laminated fabric obtained in (2) or (2') above.

7. The process according to claim 6, wherein elongating said multilayered film is carried out under heating conditions of 100° C. to 200° C.

8. The process according to claim 6, wherein elongating said multilayered film is carried out at an elongation speed of 5%/sec or more.

9. The process according to claim 6, wherein relaxing the elongated film is carried out at 100° C. or lower.

10. The process according to claim 6, wherein the elastomeric resin layer contains a polyurethane resin.

* * * * *